(12) United States Patent
Park et al.

(10) Patent No.: US 10,906,537 B2
(45) Date of Patent: Feb. 2, 2021

(54) SYSTEM AND METHOD OF DETERMINING RISK SITUATION OF COLLISION OF AUTONOMOUS VEHICLE

(71) Applicants: Hyundai Motor Company, Seoul (KR); Kia Motors Corporation, Seoul (KR)

(72) Inventors: Kyun Sang Park, Sejong (KR); Sang Hyup Lee, Gyeonggi-do (KR); Joung Hee Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 167 days.

(21) Appl. No.: 16/190,357

(22) Filed: Nov. 14, 2018

(65) Prior Publication Data

US 2020/0062251 A1 Feb. 27, 2020

(30) Foreign Application Priority Data

Aug. 27, 2018 (KR) .......................... 10-2018-0100676

(51) Int. Cl.
| | | |
|---|---|---|
| *B60W 30/095* | (2012.01) | |
| *B60W 30/09* | (2012.01) | |
| *B60W 30/08* | (2012.01) | |
| *B62D 6/00* | (2006.01) | |
| *G01C 21/34* | (2006.01) | |
| *G08G 1/16* | (2006.01) | |
| *G06F 19/00* | (2018.01) | |
| *G05D 1/00* | (2006.01) | |

(52) U.S. Cl.
CPC ..... *B60W 30/0956* (2013.01); *B60W 2552/40* (2020.02); *B60W 2554/801* (2020.02); *B60W 2554/804* (2020.02); *B60W 2900/00* (2013.01); *G05D 1/0088* (2013.01)

(58) Field of Classification Search
CPC .... B60W 30/095; B60W 30/08; B60W 30/09; B62D 6/00; G01C 21/34; G08G 1/16; G06F 19/00
See application file for complete search history.

(56) References Cited

U.S. PATENT DOCUMENTS

| | | | |
|---|---|---|---|
| 8,498,802 B2 * | 7/2013 | Yamamoto | F02N 11/0825 701/112 |
| 9,701,307 B1 * | 7/2017 | Newman | B60W 10/20 |
| 10,150,472 B2 * | 12/2018 | Benmimoun | B60W 30/095 |
| 2007/0010945 A1 * | 1/2007 | Shoda | G08G 1/163 701/301 |
| 2015/0283999 A1 * | 10/2015 | Igarashi | G08G 1/165 701/1 |
| 2016/0231130 A1 * | 8/2016 | Akiyama | B60W 30/09 |

FOREIGN PATENT DOCUMENTS

KR 2016-0069417 A 6/2016

* cited by examiner

*Primary Examiner* — Yuri Kan
(74) *Attorney, Agent, or Firm* — Mintz Levin Cohn Ferris Glovsky and Popeo, P.C.; Peter F. Corless (57) ABSTRACT

A method of determining a risk situation of a collision of an autonomous vehicle is provided. The method includes recognizing a preceding vehicle and measuring a variable factor including a distance or a relative speed between a traveling vehicle and the preceding vehicle. Whether a collision is capable of being avoided by turning or braking is determined based on the variable factor.

12 Claims, 6 Drawing Sheets

SYSTEM AND METHOD OF DETERMINING RISK SITUATION OF COLLISION OF AUTONOMOUS VEHICLE

CROSS-REFERENCE TO RELATED APPLICATIONS

This application claims priority under 35 U.S.C. § 119 to Korean Patent Application No. 10-2018-0100676, filed on Aug. 27, 2018, the disclosure of which is incorporated herein by reference in its entirety.

BACKGROUND

1. Field of the Invention

The present invention relates to a system and method of determining a risk situation of collision of an autonomous vehicle for preventing a collision between a traveling autonomous vehicle and a preceding vehicle, and particularly, to a method of determining a risk situation of collision of an autonomous vehicle, which considers situations where a collision is unable to be prevented by turning or braking.

2. Description of the Related Art

An autonomous vehicle is a vehicle that recognizes a road and automatically travels without driver control of a brake, a steering wheel, an accelerator pedal, and the like. An apparatus and an algorithm have been developed for recognizing a traveling environment for safe traveling, generating a traveling path, and recognizing an obstacle or a preceding vehicle and avoiding a collision with the obstacle or the preceding vehicle. However, the autonomous vehicle has a limit in detecting a risk situation and determining whether emergency braking is required without depending on a determination ability of a person in a situation where a driver is not within the vehicle.

A developed technology in the related art teaches a method and an apparatus for determining an emergency braking situation of a vehicle, and provides a method and an apparatus for determining an emergency braking situation of an autonomous vehicle by calculating, by a risk index calculating unit, a risk index based on an obstacle recognized by a sensor unit and correcting, by a risk index correcting unit, the risk index and determining whether emergency braking is required.

However, in the technology of the related art, the calculation of the risk index performs only the detection of a situation in which a collision with a preceding vehicle is avoidable by braking, and the process of correcting the risk index is implemented on the assumption that it is possible to avoid a collision by braking. Thus, an accident may not be prevented in a region, in which it is impossible to avoid a collision by braking.

SUMMARY

The present invention provides a method of determining a risk situation of a collision with an autonomous vehicle, which considers a region where a collision with a preceding vehicle is unavoidable by turning a traveling direction of a traveling vehicle by steering or by reducing a speed of a traveling vehicle by braking as a risk situation.

An exemplary embodiment of the present invention provides a method of determining a risk situation of a collision of an autonomous vehicle that may include: recognizing, by a sensor unit, a preceding vehicle located in front of a traveling vehicle, and measuring a variable factor including a distance or a relative speed between the traveling vehicle and the preceding vehicle; and determining whether it is possible to avoid a collision by turning, in which a risk situation determining unit determines whether it is possible to avoid the collision with the preceding vehicle by turning a traveling direction by the traveling vehicle based on the variable factor, or determining whether it is possible to avoid the collision by braking, in which the risk situation determining unit determines whether it is possible to avoid the collision with the preceding vehicle by braking by the traveling vehicle based on the variable factor, in which when it is impossible to avoid the collision by the turning or the braking, the risk situation determining unit determines the situation as a risk situation.

The process of determining whether it is possible to avoid the collision by the turning may include determining, by the risk situation determining unit, that it is impossible to avoid the collision by the turning when $\gamma_{req} > \gamma_{max}$ ($\gamma_{req}$ is a yaw rate requirement required for avoiding, by the traveling vehicle, the collision with the preceding vehicle, and $\gamma_{max}$ is a yaw rate limit obtainable by turning the traveling direction of the traveling vehicle on a road surface, on which the traveling vehicle is located).

The process of determining whether it is possible to avoid the collision by the braking may include determining, by the risk situation determining unit, that it is impossible to avoid the collision by the braking when $S_{req} < S_{brk}$ ($S_{req}$ is a distance requirement required for avoiding, by the traveling vehicle, the collision with the preceding vehicle, and $S_{brk}$ is a movement distance after the traveling vehicle performs the braking).

The process of determining whether it is possible to avoid the collision by the turning may further include: calculating, by a calculating unit, the $\gamma_{max}$ based on a frictional coefficient of the road surface, on which the traveling vehicle is traveling, and a speed of the traveling vehicle; calculating, by the calculating unit, $\theta_{req}$ ($\theta_{req}$ is a transverse angle requirement required for avoiding, by the traveling vehicle, the collision with the preceding vehicle) and calculating the $\gamma_{req}$; and comparing, by the risk situation determining unit, a value of the $\gamma_{max}$ with a value of the $\gamma_{req}$).

Additionally, the process of determining whether it is possible to avoid the collision by the braking may include: calculating, by a calculating unit, the $S_{req}$ based on the distance; calculating, by the calculating unit, $S_{brk}$ based on the relative speed and a change in time to the collision calculated based on the relative speed; and comparing, by the risk situation determining unit, a value of the $S_{req}$ with a value of the $S_{brk}$.

The calculating of the $\gamma_{req}$ may further include: calculating, by the calculating unit, a change in time to the collision based on the distance and the relative speed; and correcting, by a correcting unit, the change in time by reflecting state information regarding the traveling vehicle, and the state information regarding the traveling vehicle may be any one or more of the speed of the traveling vehicle, a speed of the preceding vehicle, and the frictional coefficient of the road surface on which the traveling vehicle is located. The calculating of the $S_{req}$ may further include correcting, by a correcting unit, the distance by reflecting state information regarding the traveling vehicle, and the state information regarding the traveling vehicle may be any one or more of the speed of the traveling vehicle, a speed of the preceding vehicle, and the frictional coefficient of the road surface.

According to the present invention including the foregoing configuration, a situation, in which it is impossible to avoid a collision by steering or braking, is determined, and thus, an accident risk of an autonomous vehicle may be decreased. Further, according to the present invention, when a risk situation is determined, a time and a distance taken to an actual collision may be corrected to secure driving stability. Further, according to the present invention, when a risk situation is determined, a condition of a road surface, on which a traveling vehicle is being driven, is considered, and thus, accuracy in the determination of the risk situation may be improved.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to the contents described in the accompanying drawings. However, the present invention is not restricted or limited by exemplary embodiments. Like reference numerals suggested in each drawing designate members which perform substantially the same functions.

The object and the effect of the present invention may be naturally understood or may become clearer through the description below, and the object and the effect of the present invention are not limited to the description below. In describing the present invention, a detailed explanation of a publicly known technology related to the present invention may be omitted so as to avoid unnecessarily obscuring the subject matter of the present invention.

Figure 1:
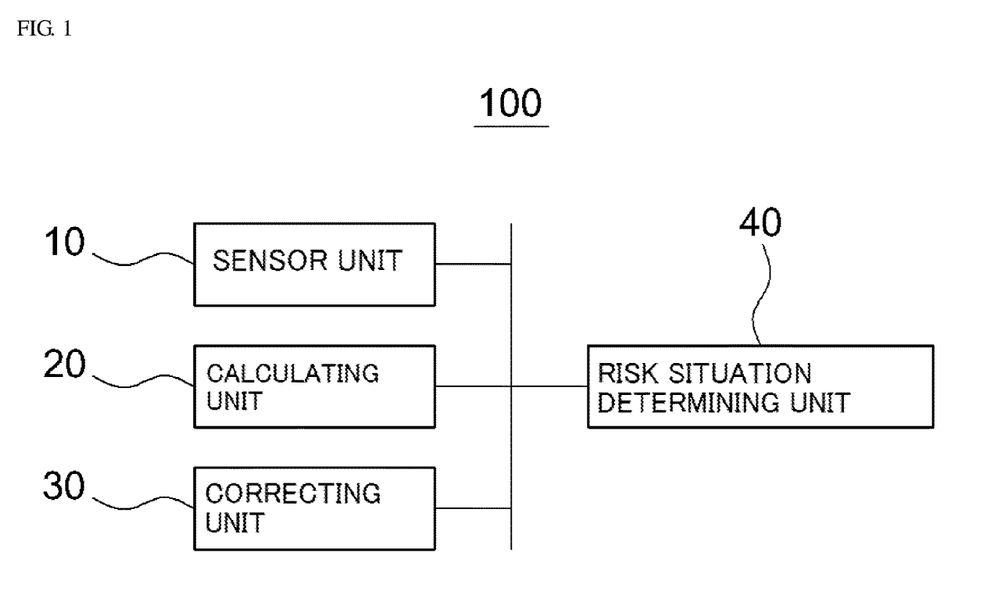
FIG. 1 is a diagram illustrating a system for determining a risk situation of a collision of an autonomous vehicle according to an exemplary embodiment of the present invention.

FIG. 1 illustrates a system 100 for determining a risk situation of a collision of an autonomous vehicle of the present invention. Referring to FIG. 1, the system 100 for determining a risk situation of a collision of an autonomous vehicle of the present invention may include a sensor unit 10, a calculating unit 20, a correcting unit 30, or a risk situation determining unit 40. A controller of the vehicle may be configured to operate each of the unit of the system.

The sensor unit 10 may be configured to sense traveling environment information of a traveling vehicle based on image information, laser sensing information, radar received information, and the like by utilizing an apparatus, such as a camera, a laser scanner, and a radar. However, the apparatus included in the sensor unit 10 is not limited thereto, and may include all of the sensors which are capable of detecting an environment around a vehicle. The calculating unit 20 may be configured to execute a series of calculation processes for determining a risk situation of a collision of an autonomous vehicle based on an equation pre-input based on the traveling environment information of the traveling vehicle recognized by the sensor unit 10, and derive a result value for determining the risk situation of the collision of the autonomous vehicle. In particular, the calculating unit 20 may be operated by a controller of the system.

The correcting unit 30 may be configured to correct a change in time to the collision and a distance to the collision by reflecting the traveling environment information, such as a speed of the traveling vehicle, a speed of the preceding vehicle, or a fractional coefficient of a road, on which the traveling vehicle is being driven, recognized by the sensor unit 10 during the process of deriving, by the calculating unit 20, the result value, thereby improving accuracy of the determination of the risk situation. The risk situation determining unit 40 may be configured to receive the information from the sensor unit 10, the calculating unit 20, or the correcting unit 30 and determine whether the traveling vehicle is capable of avoiding the collision with the preceding vehicle.

Figure 2:
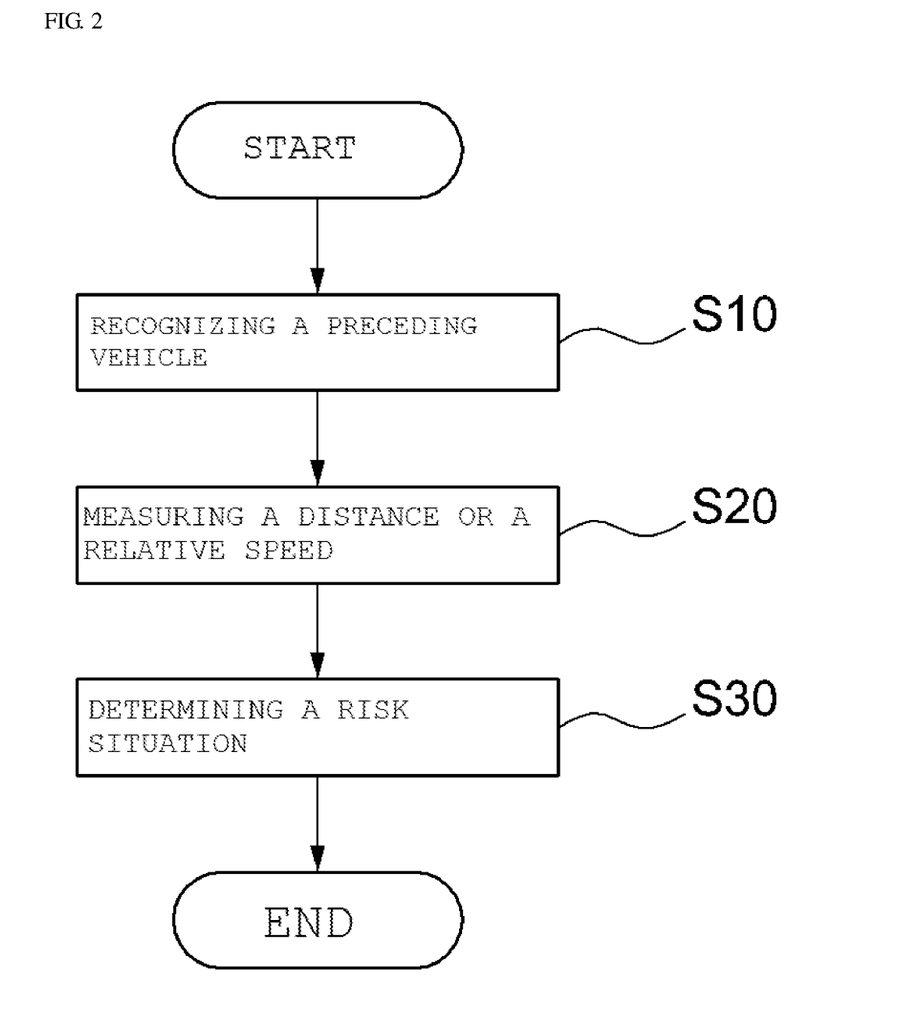
FIG. 2 is a diagram illustrating a method of determining a risk situation of a collision of an autonomous vehicle according to an exemplary embodiment of the present invention.

The method of transceiving the information by the sensor unit 10, the calculating unit 20, the correcting unit 30, or the risk situation determining unit 40 may be executed by a communication method such as controller area network (CAN) communication, but is not limited thereto. FIG. 2 is a diagram illustrating a method of determining a risk situation of a collision of an autonomous vehicle of the present invention.

Referring to FIG. 2, the sensor unit 10 may be configured to recognize a preceding vehicle located in front of a traveling vehicle or a subject vehicle (S10), and then measure a distance or a relative speed between the traveling vehicle and the preceding vehicle, which is a variable factor of the vehicle (S20). The risk situation determining unit 40 may then be configured to perform a risk situation determining operation S30, by determining whether the traveling vehicle is capable of avoiding the collision with the preceding vehicle by turning a traveling direction based on the variable factor or by determining whether the traveling vehicle is capable of avoiding the collision with the preceding vehicle by braking based on the variable factor. When the collision is unavoidable by the turning or braking of the vehicle, the risk situation determining unit 40 may be configured to determine the situation as a risk situation.

Figure 3:
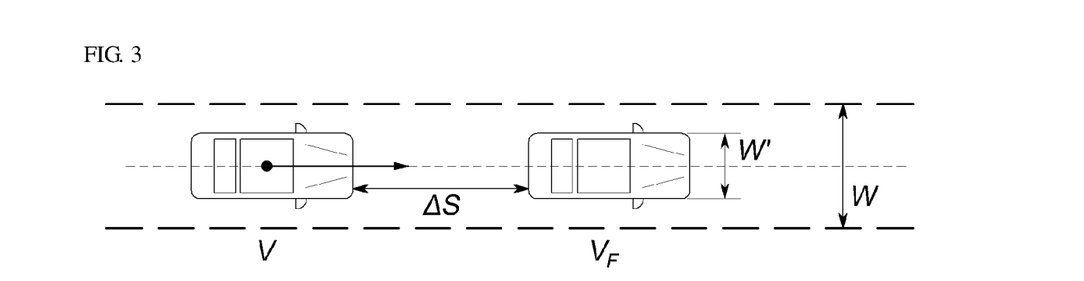
FIG. 3 is a diagram illustrating behaviors of an autonomous vehicle and a preceding vehicle according to an exemplary embodiment of the present invention.

FIG. 3 is a diagram illustrating behaviors of an autonomous vehicle and a preceding vehicle of the present invention. Referring to FIG. 3, a variable factor measured by the sensor unit 10 may be used to determine a risk situation of a collision with an autonomous vehicle of the present invention. In particular, V represents a speed of a traveling vehicle, VF represents a speed of a preceding vehicle, W is a road width, W' is a width of the preceding vehicle, and ΔS represents a distance between the traveling vehicle and the preceding vehicle. The foregoing V, VF, W, W', and ΔS may be measured by various sensor apparatuses, for example, a camera device and a wheel speed sensor, of the sensor unit 10.

Figure 4:
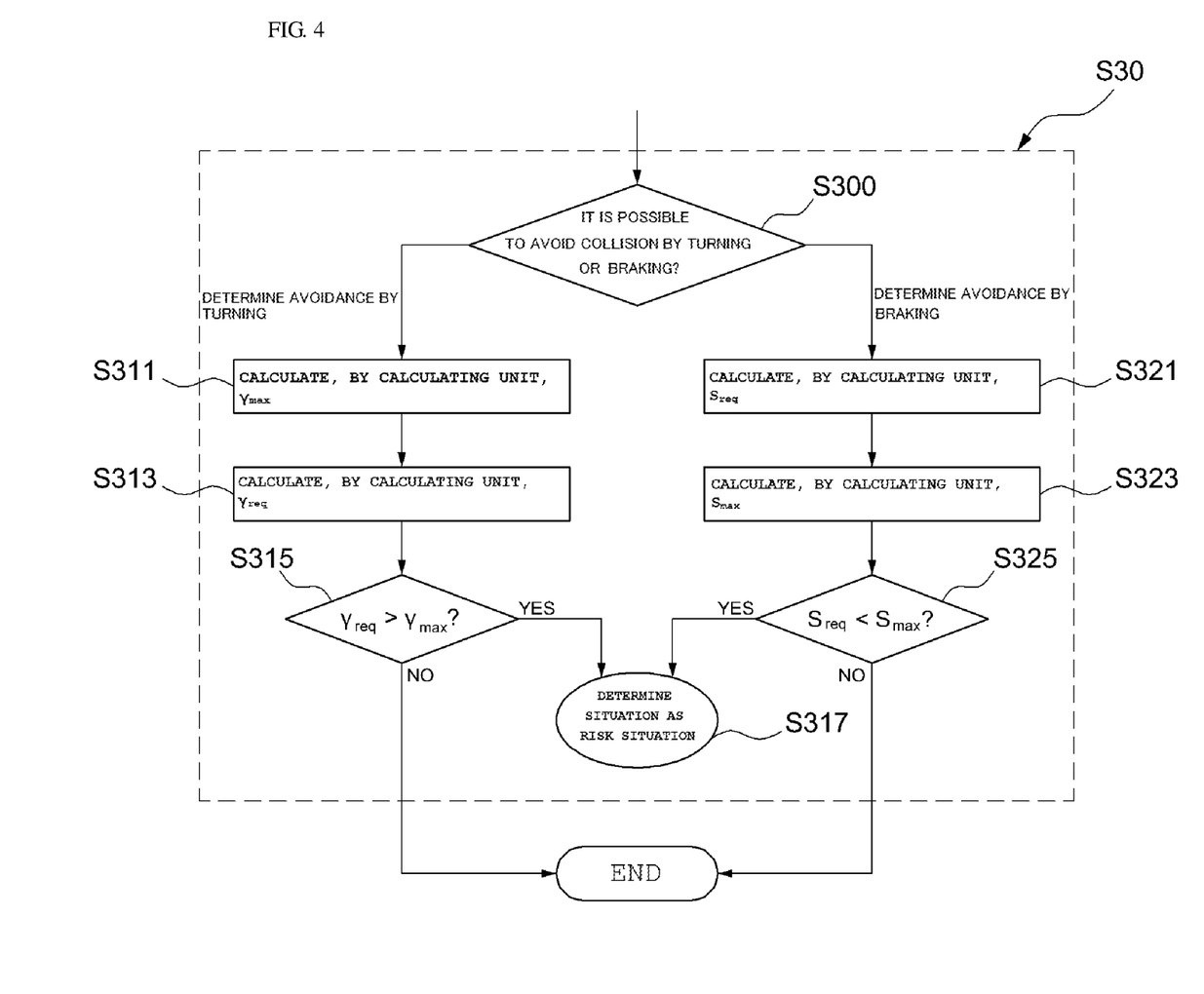
FIG. 4 is a flowchart illustrating a risk situation determining operation, in which avoidance by turning or avoidance by braking is executed according to an exemplary embodiment of the present invention.

FIG. 4 is a flowchart illustrating the risk situation determining operation S30, in which avoidance by turning or avoidance by braking is executed, of the present invention. Referring to FIG. 4, the risk situation determining unit 40 may be configured to determine both whether it is possible to avoid the collision by turning and determine whether it is possible to avoid the collision by braking regardless of the order, and when it is impossible to execute any one of the avoidance by turning and the avoidance by braking, the risk situation determining unit 40 may be configured to determine the situation as a risk situation (S300).

In the process of determining whether it is possible to avoid the collision by turning, when $\gamma_{req} > \gamma_{max}$, the risk situation determining unit 40 may be configured to determine that the collision is unavoidable by turning. Particularly, $\gamma_{req}$ means a yaw rate requirement required for avoiding, by the traveling vehicle, the collision with the preceding vehicle, and $\gamma_{max}$ means a yaw rate limit obtainable by turning a traveling direction of the traveling vehicle on a road surface, on which the traveling vehicle is being driven. Particularly, $\gamma_{max}$ may be calculated by Equation 1 below.

$$\gamma_{max} = \frac{\mu g}{V}$$

wherein, μ is a frictional coefficient of a road surface, on which the traveling vehicle is being driven, g is acceleration of gravity, and V is a speed of the traveling vehicle.

The determining of whether it is possible to avoid the collision by turning may further include process S311 of calculating, by the calculating unit 20, $\gamma_{max}$ with the Equation 1 based on a frictional coefficient of the road surface, on which the traveling vehicle is being driven, and a speed of the traveling vehicle, process S313 of calculating, by the calculating unit 20, $\theta_{req}$ and calculating $\gamma_{req}$, and process S315 of comparing, by the risk situation determining unit, a value of $\gamma_{max}$ with a value of $\gamma_{req}$ ($\gamma_{req} > \gamma_{max}$). In particular, $\theta_{req}$ means a transverse angle requirement required for avoiding, by the traveling vehicle, the collision with the preceding vehicle, and may be calculated by Equation 2 below.

$$\theta_{reg} = \tan^{-1}\left(\frac{\omega}{\Delta S}\right)$$

Referring to FIG. 3, a value of a transverse angle requirement $\theta_{req}$ required for avoiding, by the traveling vehicle, the collision with the preceding vehicle may be calculated as described below. In particular, the value of $\theta_{req}$ may be calculated with the vehicle width W' of the preceding vehicle and an arctangent value of the distance ΔS between the traveling vehicle and the preceding vehicle, but the value of $\theta_{req}$ may be set to be greater than a departure angle required for avoiding the collision by increasing the value of the arctangent result value. This is for the purpose of securing safety by setting the transverse angle requirement required for avoiding the collision with a greater margin than the actually required departure angle.

Accordingly, the value of $\theta_{req}$ may be calculated using the road width W greater than W', or may be calculated by using a value between W' and W. In addition, $\gamma_{req}$ may be calculated by Equation 3 below by using the value of $\theta_{req}$.

$$\gamma_{reg} = \frac{\theta_{reg}}{t} = \frac{\theta_{reg}}{\Delta t - TSM}, \left(\Delta t = \frac{\Delta S}{\Delta V}\right), (\Delta V = |V - V_P|)$$

wherein, t is a time to the collision, and TSM is time for safety margin to avoid for correcting a change in time by reflecting state information regarding the traveling vehicle, which is to be described below. In other words, when $\gamma_{req}$ calculated by reflecting a current traveling situation measured by the sensor unit 10 is greater than $\gamma_{max}$ that is a maximum yaw rate obtainable through a linear behavior of the traveling vehicle under a current road surface condition, the traveling vehicle may be determined to be unable to avoid the collision with the preceding vehicle through the linear behavior by turning the traveling direction under the current road surface condition, and thus, the risk situation determining unit 40 may be configured to determine the situation as a risk situation (S317).

In the determination of whether it is possible to avoid the collision by braking, when $S_{req}<S_{brk}$, the risk situation determining unit 40 may be configured to determine that the collision by braking in unavoidable. $S_{req}$ is a distance requirement required for avoiding, by the traveling vehicle, the collision with the preceding vehicle, and $S_{brk}$ refers to a movement distance after the traveling vehicle performs the braking. Particularly, $S_{req}$ and $S_{brk}$ may be calculated by Equations 4 and 5 below.

$$S_{req} = \Delta S - DSM$$

$$S_{brk} = |\Delta V| \times \Delta t - 1/2 \mu g \times \Delta t^2$$

wherein, DSM is a distance for safety margin to avoid for correcting a change in time by reflecting state information regarding the traveling vehicle, which is to be described below.

The determination of whether it is possible to avoid the collision by braking may further include: process S321 of calculating, by the calculating unit 20, $S_{req}$ based on the distance, process S323 of calculating, by the calculating unit 20, $S_{brk}$ based on the relative speed and a change in time to the collision calculated based on the relative speed; and process S325 of comparing, by the risk situation determining unit 40, the value of $S_{req}$ and the value of $S_{brk}$ ($S_{req}<S_{brk}$).

In other words, when the movement distance $S_{brk}$ after the braking of the traveling vehicle under the current road surface condition is greater than the distance $S_{req}$ required for avoiding the collision calculated by reflecting the current traveling situation measured by the sensor unit 10, the collision with the preceding vehicle may be determined to be unavoidable by the braking by the traveling vehicle under the current road surface condition, and thus, the risk situation determining unit 40 may be configured to determine the situation as a risk situation (S317).

As a result, both the process of determining whether it is possible to avoid the collision by turning and the process of determining whether it is possible to avoid the collision by braking may be performed, and thus, in response to determining that any one of the avoidance by turning and the avoidance by braking is impossible, the risk situation determining unit 40 may be configured to determine the situation as the risk situation (S317), and the routine of the present invention may be terminated.

Although not illustrated in the drawings, the present invention may further include a mechanism for handling a situation, in which it is impossible to avoid the collision by the turning or a general braking method, after the method of determining a risk situation of a collision of an autonomous vehicle of the present invention is terminated.

Figure 5:
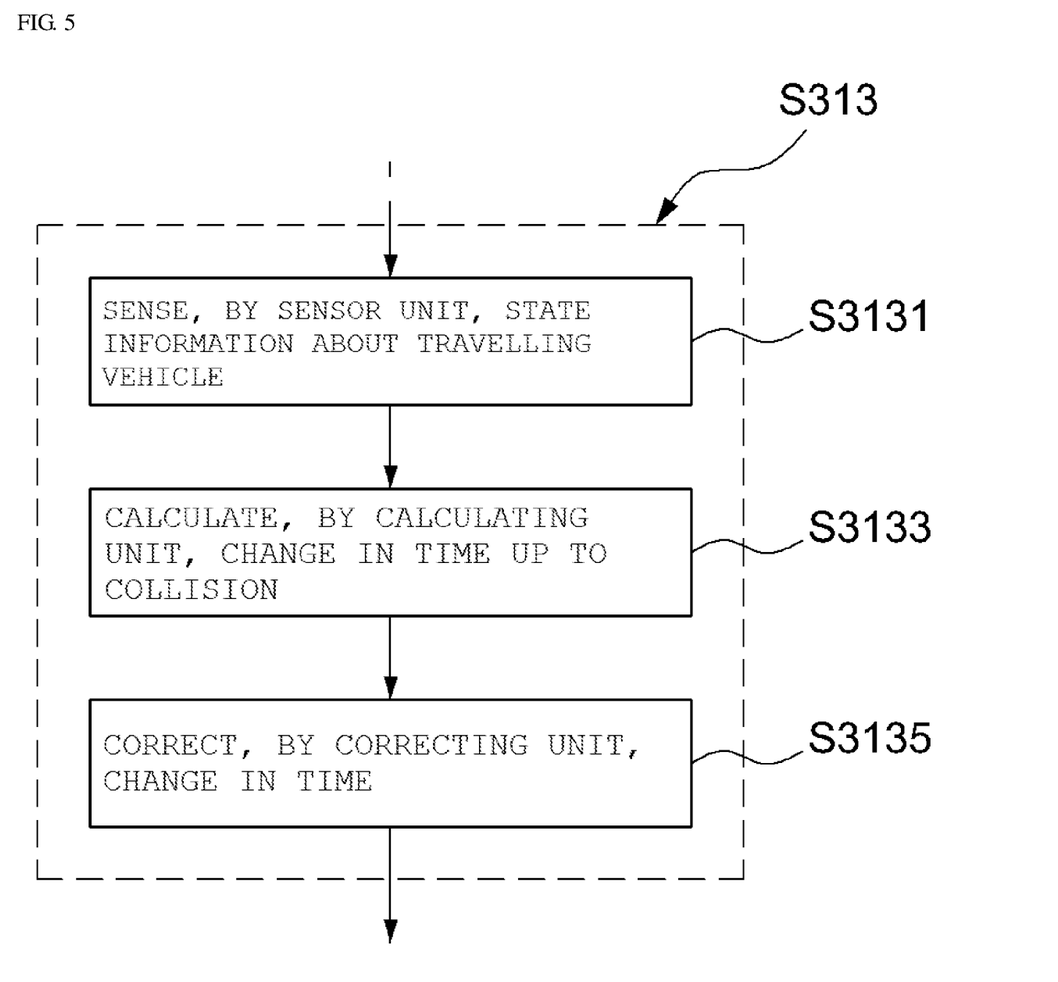
FIG. 5 is a flowchart illustrating a process of calculating a yaw rate requirement $\gamma_{req}$ according to an exemplary embodiment of the present invention.

FIG. 5 is a flowchart illustrating process S313 of calculating a yaw rate requirement of the present invention. The method described herein below may be executed by a controller. Referring to FIG. 5, the process of calculating $\gamma_{req}$ may further include: process S3131 of sensing, by the sensor unit 10, state information regarding the traveling vehicle; process S3133 of calculating, by the calculating unit 20, a change in time to the collision based on the distance and the relative speed; and process S3135 of correcting, by the correcting unit 30, reflecting the state information regarding the traveling vehicle and correcting the change in time.

The state information regarding the traveling vehicle may be any one or more of the speed of the traveling vehicle, the speed of the preceding vehicle, and the frictional coefficient of the road surface, but is not limited thereto, and the state information regarding the traveling vehicle may further include the weight of the vehicle, a speed of the vehicle, tire pressure, brake pressure, and the like according to a device mounted to the sensor unit 10, and the state information regarding the traveling vehicle may be stored in the risk situation determining unit 40 as variable data. Particularly, $\gamma_{req}$ may be calculated by Equation below as previously described above.

$$\gamma_{req} = \frac{\theta_{req}}{t} = \frac{\theta_{req}}{\Delta t - TSM}, \left(\Delta t = \frac{\Delta S}{\Delta V}\right)$$

In particular, TSM may be set by the variable data, and a value of $\Delta t$ expected to be taken up to the actual collision is corrected and $\gamma_{req}$ is calculated to be greater than a yaw rate required for actually avoiding the collision to secure safety.

Figure 6:
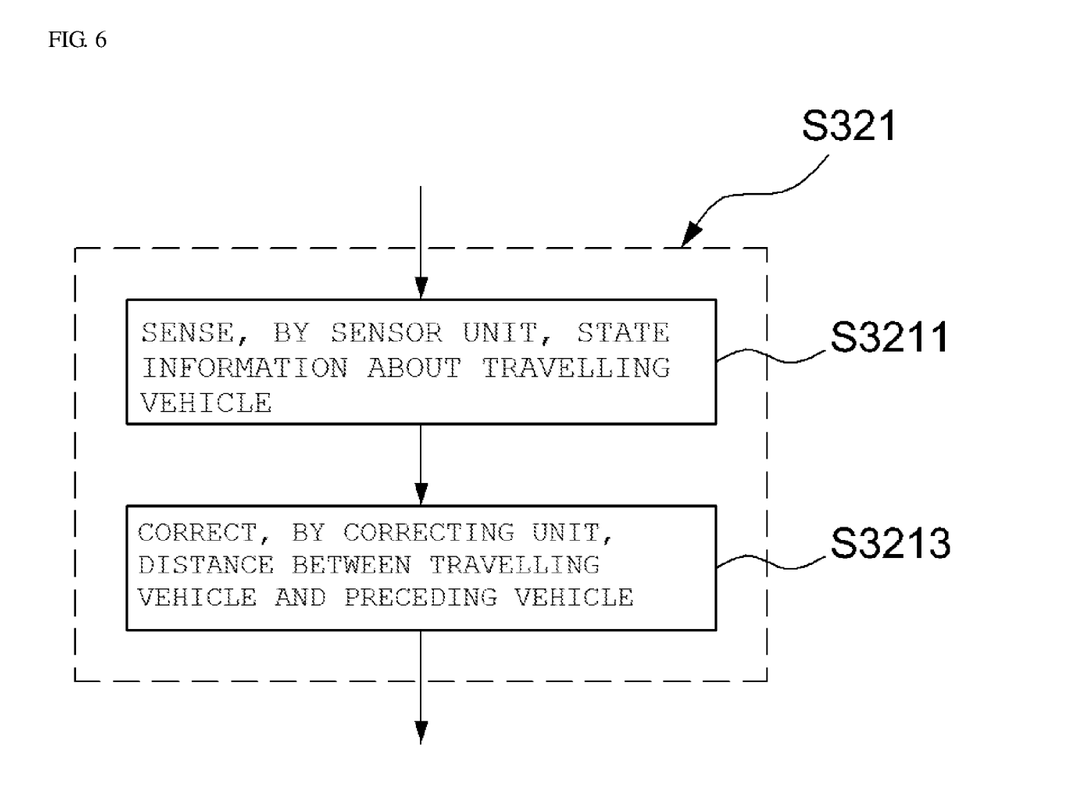
FIG. 6 is a flowchart illustrating a process of calculating a distance requirement $S_{req}$ according to an exemplary embodiment of the present invention.

FIG. 6 illustrates process S321 of calculating the distance requirement of the present invention. Referring to FIG. 6, the process of calculating $S_{req}$ may further include process S3211 of sensing, by the sensor unit 10, state information regarding the traveling vehicle; and process S3213 of reflecting, by the correcting unit 30, the state information regarding the traveling vehicle and correcting the distance. $S_{req}$ may be calculated by Equation as previously described above.

$$S_{req} = \Delta S - DSM$$

In particular, DSM may be set by the same method as that of TMS, and a value of $\Delta S$ to the actual collision is corrected and $S_{req}$ is calculated to be less than a distance required for actually avoiding the collision to secure safety.

In the foregoing, the present invention has been described in detail with reference to the representative exemplary embodiment, but those skilled in the art may understand that the exemplary embodiment may be variously modified without departing from the scope of the present invention. Accordingly, the scope of the present invention shall not be defined while being limited to the aforementioned exemplary embodiment, but shall be defined by all of the changes or modified forms derived from the equivalent concepts to the claims, as well as the claims to be described below.

What is claimed is:

1. A method of determining a risk situation of a vehicle collision, comprising:
    recognizing, by a sensor unit, a preceding vehicle located in front of a traveling vehicle, and measuring a variable factor including a distance or a relative speed between the traveling vehicle and the preceding vehicle;
    determining, by a controller, whether it is possible to avoid the collision with the preceding vehicle by turning a traveling direction by the traveling vehicle based on the variable factor, or determining whether it is possible to avoid the collision with the preceding vehicle by braking by the traveling vehicle based on the variable factor; and
    determining, by the controller, the risk situation when the collision is unavoidable by the turning or the braking, wherein the determining of whether it is possible to avoid the collision by the turning includes determining, by the controller, that the collision is unavoidable by the turning when $\gamma_{req} > \gamma_{max}$ wherein, $\gamma_{req}$ is a yaw rate requirement required for avoiding, by the traveling vehicle, the collision with the preceding vehicle, and $\gamma_{max}$ is a yaw rate limit obtainable by turning the traveling direction of the traveling vehicle on a road surface, on which the traveling vehicle is being driven.

2. The method of claim 1, wherein the determining of whether it is possible to avoid the collision by the braking includes determining, by the controller, that the collision is unavoidable by the braking when $S_{req} < S_{brk}$ wherein, $S_{req}$ is a distance requirement required for avoiding, by the traveling vehicle, the collision with the preceding vehicle, and $S_{brk}$ is a movement distance after the traveling vehicle performs the braking.

3. The method of claim 1, wherein the determining of whether it is possible to avoid the collision by the turning further includes:

calculating, by the controller, the $\gamma_{max}$ based on a frictional coefficient of the road surface, on which the traveling vehicle is being driven, and a speed of the traveling vehicle;

calculating, by the controller, $\theta_{req}$ and the $\gamma_{req}$; and comparing, by the controller, a value of the $\gamma_{max}$ with a value of the $\gamma_{req}$, wherein $\theta_{req}$ is a transverse angle requirement required for avoiding, by the traveling vehicle, the collision with the preceding vehicle.

4. The method of claim 2, wherein the determining of whether it is possible to avoid the collision by the braking further includes:

calculating, by the controller, the $S_{req}$ based on the distance;

calculating, by the controller, $S_{brk}$ based on the relative speed and a change in time to the collision calculated based on the relative speed; and comparing, by the controller, a value of the $S_{req}$ with a value of the $S_{brk}$.

5. The method of claim 3, wherein the calculating of the $\gamma_{req}$ further includes:

calculating, by the controller, a change in time to the collision based on the distance and the relative speed; and correcting, by the controller, the change in time by reflecting state information regarding the traveling vehicle, wherein the state information regarding the traveling vehicle is any one or more of the speed of the traveling vehicle, a speed of the preceding vehicle, and the frictional coefficient of the road surface.

6. The method of claim 4, wherein the calculating of the $S_{req}$ further includes:

correcting, by the controller, the distance by reflecting state information regarding the traveling vehicle, wherein the state information about the traveling vehicle is any one or more of the speed of the traveling vehicle, a speed of the preceding vehicle, and the frictional coefficient of the road surface on which the traveling vehicle is being driven.

7. A system for determining a risk situation of a vehicle collision, the system comprising:

a sensor unit configured to recognize a preceding vehicle located in front of a traveling vehicle, and measure a variable factor including a distance or a relative speed between the traveling vehicle and the preceding vehicle; and a controller configure to:

determine whether it is possible to avoid the collision with the preceding vehicle by turning a traveling direction by the traveling vehicle based on the variable factor, or determine whether it is possible to avoid the collision with the preceding vehicle by braking by the traveling vehicle based on the variable factor; and determine the risk situation when the collision is unavoidable by the turning or the braking, wherein the controller is configured to determine that the collision is unavoidable by the turning when $\gamma_{req} > \gamma_{max}$, wherein, $\gamma_{req}$ is a yaw rate requirement required for avoiding, by the traveling vehicle, the collision with the preceding vehicle, and $\gamma_{max}$ is a yaw rate limit obtainable by turning the traveling direction of the traveling vehicle on a road surface, on which the traveling vehicle is being driven.

8. The system of claim 7, wherein the controller is configured to determine that the collision is unavoidable by the braking when $S_{req} < S_{brk}$, wherein, $S_{req}$ is a distance requirement required for avoiding, by the traveling vehicle, the collision with the preceding vehicle, and $S_{brk}$ is a movement distance after the traveling vehicle performs the braking.

9. The system of claim 7, wherein the controller is further configured to:

calculate the $\gamma_{max}$, based on a frictional coefficient of the road surface, on which the traveling vehicle is being driven, and a speed of the traveling vehicle;

calculate $\theta_{req}$ and the $\gamma_{req}$; and compare a value of the $\gamma_{max}$ with a value of the $\gamma_{req}$, wherein $\theta_{req}$ is a transverse angle requirement required for avoiding, by the traveling vehicle, the collision with the preceding vehicle.

10. The system of claim 8, wherein the controller is further configured to:

calculate the $S_{req}$ based on the distance;

calculate $S_{brk}$ based on the relative speed and a change in time to the collision calculated based on the relative speed; and compare a value of the $S_{req}$ with a value of the $S_{brk}$.

11. The system of claim 9, wherein in calculating the $\gamma_{req}$ the controller is further configured to:

calculate a change in time to the collision based on the distance and the relative speed; and correct the change in time by reflecting state information regarding the traveling vehicle, wherein the state information regarding the traveling vehicle is any one or more of the speed of the traveling vehicle, a speed of the preceding vehicle, and the frictional coefficient of the road surface.

12. The system of claim 10, wherein in calculating the $S_{req}$ the controller is further configured to:

correct the distance by reflecting state information regarding the traveling vehicle, wherein the state information about the traveling vehicle is any one or more of the speed of the traveling vehicle, a speed of the preceding vehicle, and the frictional coefficient of the road surface on which the traveling vehicle is being driven.

* * * * *